(12) United States Patent
Sui et al.

(10) Patent No.: US 12,536,317 B2
(45) Date of Patent: Jan. 27, 2026

(54) MANAGING THE ANALYSIS OF SENSITIVE DATA ACROSS MULTIPLE DATA CENTERS

(71) Applicant: International Business Machines Corporation, Armonk, NY (US)

(72) Inventors: Guang Han Sui, Beijing (CN); Peng Hui Jiang, Beijing (CN); Lan Zhe Liu, Beijing (CN); Wei Ge, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 18/510,172

(22) Filed: Nov. 15, 2023

(65) Prior Publication Data

US 2025/0156568 A1    May 15, 2025

(51) Int. Cl.
*G06F 21/62* (2013.01)
(52) U.S. Cl.
CPC .............................. *G06F 21/6218* (2013.01)
(58) Field of Classification Search
None
See application file for complete search history.

(56) References Cited

U.S. PATENT DOCUMENTS

| | | | |
|---|---|---|---|
| 7,065,549 B2 | 6/2006 | Sun et al. | |
| 9,460,171 B2 | 10/2016 | Marrelli et al. | |
| 10,509,687 B2 | 12/2019 | Jain et al. | |
| 11,055,421 B2 | 7/2021 | Garcia et al. | |
| 11,290,438 B2 * | 3/2022 | Mathew | H04L 67/14 |
| 11,625,368 B1 * | 4/2023 | Kushtagi | H04L 9/3247 |
| | | | 707/609 |
| 2003/0187915 A1 | 10/2003 | Sun et al. | |
| 2005/0243604 A1 | 11/2005 | Harken et al. | |
| 2012/0239734 A1 * | 9/2012 | Dominick | G06F 9/505 |
| | | | 709/203 |
| 2014/0351924 A1 | 11/2014 | Myers | |
| 2015/0134589 A1 | 5/2015 | Marrelli et al. | |

(Continued)

FOREIGN PATENT DOCUMENTS

CN    107491045 B    9/2020

OTHER PUBLICATIONS

Walid Rjaibi et al., "Identify data locations and establish an inventory of sensitive data", https://www.ibm.com/cloud/architecture/architectures/security-data-identify-locations-establish-inventory-solution/, Printed Aug. 14, 2023, 10 pages.

(Continued)

*Primary Examiner* — Brandon Hoffman
(74) *Attorney, Agent, or Firm* — Michael A. Petrocelli

(57) ABSTRACT

Embodiments of the present invention disclose an approach for data security and management. Specifically, the approach involves managing the analysis of sensitive data across multiple data centers. The system includes a data location repository that stores and updates information regarding the locations of sensitive data in data centers. When a request to access sensitive data from an analysis process is received, a specific data center where the data is stored is identified. The necessary components of the analysis process are transferred to that data center. The migrated analysis process is then executed using the locally stored sensitive data, without physically transferring the data. The generated analysis results are transferred back to the original data center where the analysis process originated.

20 Claims, 5 Drawing Sheets

(56) References Cited

U.S. PATENT DOCUMENTS

| | | |
|---|---|---|
| 2017/0300368 A1 | 10/2017 | Jain et al. |
| 2018/0007050 A1 | 1/2018 | Ruggiero et al. |
| 2019/0012471 A1 | 1/2019 | Garcia et al. |
| 2023/0177201 A1* | 6/2023 | Durand ............... G06F 21/6227 726/4 |
| 2023/0246818 A1* | 8/2023 | Peddada ............... H04L 9/0825 713/171 |

OTHER PUBLICATIONS

Zhipeng Jia et al., "The Research-Data-Centre in Research-Data-Centre Approach: A First Step Towards Decentralised International Data Sharing", https://www.researchgate.net/publication/228972707, Published in IASSIST Quarterly, Publication Date Jan. 31, 2012, 19 pages.

* cited by examiner

MANAGING THE ANALYSIS OF SENSITIVE DATA ACROSS MULTIPLE DATA CENTERS

TECHNICAL FIELD

The present invention relates to data security and management and more specifically to embodiments for managing the analysis of sensitive data across multiple data centers.

BACKGROUND

In some countries that have strict data protection regulations in place, the transfer of data between different data centers can be heavily restricted. This can pose difficulties for data analysis processes that require accessing and analyzing data from multiple data centers. Within a specific jurisdiction, employees typically must carefully review and obtain permissions to access the data, which can be costly. Transferring data outside of the jurisdiction can be extremely challenging.

The secure management and transfer of data are usually critical components in various industries, ensuring the protection of sensitive information and facilitating efficient data analysis. In today's interconnected world, organizations can rely on the seamless exchange of data between different data centers to drive innovation and make informed business decisions. However, data transfer limitations can impede these processes, particularly in industries where comprehensive data analysis is essential. The ability to access and analyze data from multiple data centers can play a crucial role in various research fields, enabling researchers to gain valuable insights, identify trends, and make data-driven decisions.

SUMMARY

Embodiments of the present invention disclose an approach for data security and management. Specifically, the approach involves managing the analysis of sensitive data across multiple data centers. The system includes a data location repository that stores and updates information regarding the locations of sensitive data in data centers. When a request to access sensitive data from an analysis process is received, a specific data center where the data is stored is identified. The necessary components of the analysis process are transferred to that data center. The migrated analysis process is then executed using the locally stored sensitive data, without physically transferring the data. The generated analysis results are transferred back to the original data center where the analysis process originated.

A first aspect of the present invention provides a method for managing an analysis of sensitive data across multiple data centers, comprising: receiving, by a process migration engine, a request to access sensitive data from an analysis process executing on a first data center; determining, by the process migration engine, a second data center where the sensitive data is stored; migrating, by the process migration engine, the analysis process from the first data center to the second data center; executing, by the process migration engine, the analysis process on the second data center using the sensitive data; generating, by the process migration engine, an analysis result within the second data center; and transferring, by the process migration engine, the analysis result from the second data center to the first data center.

A second aspect of the present invention provides a computing system for managing an analysis of sensitive data across multiple data centers, comprising: a processor; a memory device coupled to the processor; and a computer readable storage device coupled to the processor, wherein the storage device contains program code executable by the processor via the memory device to implement a method, the method comprising: receiving, by a process migration engine, a request to access sensitive data from an analysis process executing on a first data center; determining, by the process migration engine, a second data center where the sensitive data is stored; migrating, by the process migration engine, the analysis process from the first data center to the second data center; executing, by the process migration engine, the analysis process on the second data center using the sensitive data; generating, by the process migration engine, an analysis result within the second data center; and transferring, by the process migration engine, the analysis result from the second data center to the first data center.

A third aspect of the present invention provides a computer program product for managing an analysis of sensitive data across multiple data centers, and program instructions stored on the computer readable storage device, to: receive, by a process migration engine, a request to access sensitive data from an analysis process executing on a first data center; determine, by the process migration engine, a second data center where the sensitive data is stored; migrate, by the process migration engine, the analysis process from the first data center to the second data center; execute, by the process migration engine, the analysis process on the second data center using the sensitive data; generate, by the process migration engine, an analysis result within the second data center; and transfer, by the process migration engine, the analysis result from the second data center to the first data center.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
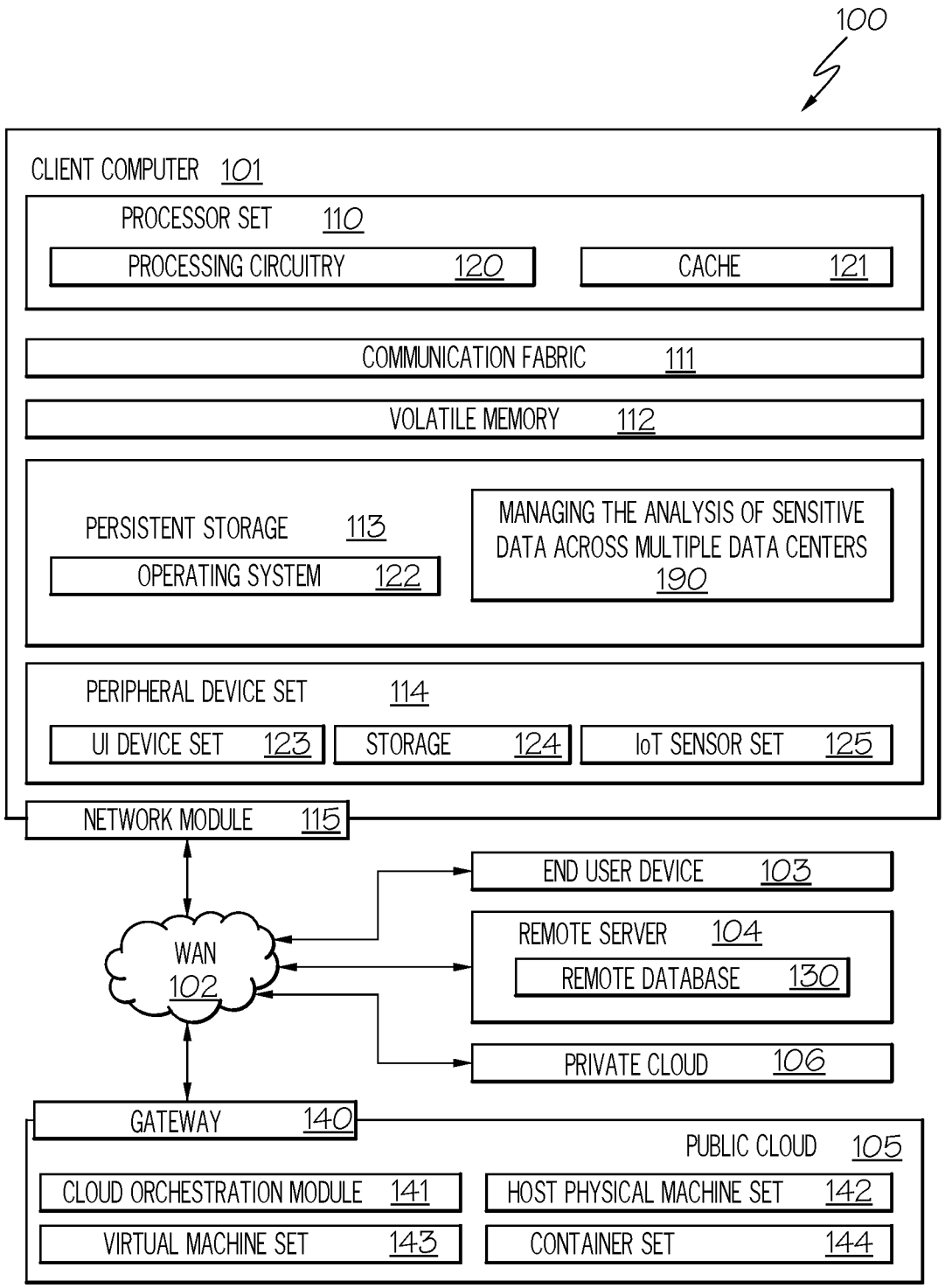
FIG. 1 depicts a block diagram illustrating an example of an environment for the execution of at least some of the computer code involved in performing the inventive methods, in accordance with embodiments of the present invention.

Computing environment 100 of FIG. 1 contains an example of an environment for the execution of at least some of the computer code involved in performing the inventive methods, such as managing the analysis of sensitive data across multiple data centers 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, the term "sensitive data" refers to any type of information that, if disclosed or compromised, could cause harm, damage, or significant consequences to individuals, organizations, or even national security. It typically includes personally identifiable information such as names, addresses, social security numbers, financial data, medical records, login credentials, or any other data that can be used to identify, discriminate against, or harm individuals. Additionally, sensitive data can encompass trade secrets, intellectual property, classified government information, proprietary business data, or any other confidential information that, if exposed, could lead to financial loss, reputational damage, legal ramifications, etc. The protection of sensitive data can be crucial to maintain privacy, security, or trust in various sectors, including healthcare, finance, government, and technology.

In places with stringent data protection regulations, the transfer of data between different data centers can be highly restricted, posing significant challenges for data analysis processes that necessitate access to and examination of data from multiple locations. Within a specific jurisdiction, employees might be required to undergo meticulous reviews and obtain permissions to access such data, incurring substantial costs. Transferring data beyond the jurisdiction's boundaries can prove exceedingly arduous.

Efficient and secure data management and transfer can be pivotal in numerous industries, as they ensure the safeguarding of sensitive information and enable effective data analysis. In today's interconnected global landscape, organizations typically rely on seamless data exchange between diverse data centers to drive innovation and informed decision-making. However, these data transfer constraints can hinder these processes, particularly in sectors where comprehensive data analysis is vital.

Embodiments of the present invention disclose an approach for data security and management. Specifically, the approach involves managing the analysis of sensitive data across multiple data centers. The system includes a data location repository that stores and updates information regarding the locations of sensitive data in data centers. When a request to access sensitive data from an analysis process is received, a specific data center where the data is stored is identified. The necessary components of the analysis process are transferred to that data center. The migrated analysis process is then executed using the locally stored sensitive data, without physically transferring the data. The generated analysis results are transferred back to the original data center where the analysis process originated.

Existing data migration solutions often involve the transmission of sensitive data from one location to another, which poses significant security risks. Such data transfers can expose sensitive information to various threats, including interception, data breaches, and unauthorized access. The present invention introduces a novel system and method for secure in-place process migration of sensitive data. The system allows data processing and analysis tasks to be migrated without the need to physically transfer the underlying sensitive data. When a process requires access to sensitive data residing in a different data center, this system can seamlessly migrate the process to the specific data center where the necessary data is stored. Once relocated, the process can gain the ability to work directly with the sensitive data without any physical transfer, ensuring data security. Importantly, the sensitive data in the original center remains protected, as it cannot be moved to another location through process migration. The system can facilitate the efficient migration of analysis results back to the originating data center. This approach ensures both security and flexibility, enabling organizations to harness the advantages of sensitive data analysis across multiple data centers while maintaining stringent data protection measures.

As used herein, "process migration" refers to the secure and efficient relocation of a data processing task or workflow from one computing environment or location to another within the same system, all while safeguarding sensitive data. This migration process can entail transferring the computational instructions and associated processing state while keeping the sensitive data in its original location or in secure virtualized containers, thereby eliminating the need for direct data transfer and ensuring data security. This innovative process migration system can facilitate workload redistribution and resource optimization without compromising data integrity and confidentiality.

Figure 2:
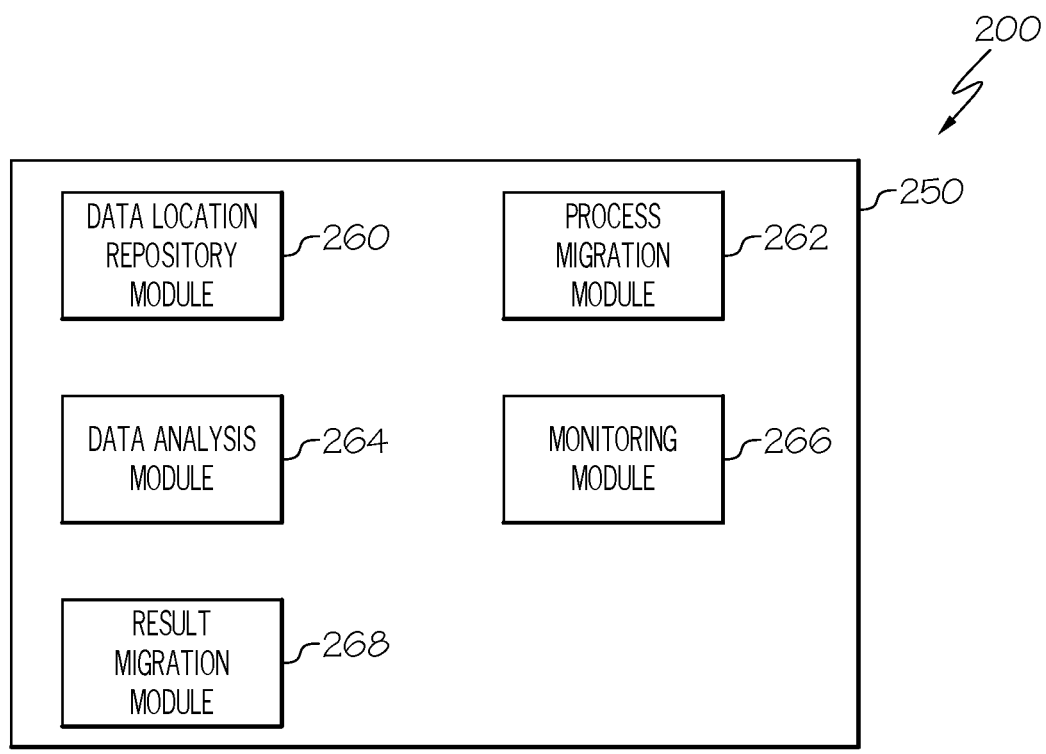
FIG. 2 depicts a block diagram of a system architecture involved in performing the inventive methods, in accordance with embodiments of the present invention.

FIG. 2 depicts a block diagram of one or more components of a system environment 200 by which services are provided by a process migration engine 250, in accordance with an embodiment of the present disclosure. In accordance with some embodiments, the process migration engine 250 is configured to provide for secure in-place process migration of sensitive data. As shown, process migration engine 250 includes data location repository module 260, process migration module 262, data analysis module 264, monitoring module 266, and result migration module 268.

As used herein, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

FIGS. 3-7 will be used to walk through an embodiment of the present invention, emphasizing the interconnected nature of these figures. The deliberate linkage between these figures creates a seamless transition from one to the next. This deliberate arrangement serves to illustrate that each figure is an integral part of an overall process, contributing to a comprehensive understanding of the present invention's methodology. FIGS. 3-7 demonstrate how each figure naturally flows from its predecessor, forming a continuous narrative that elucidates the entire process.

Figure 3:
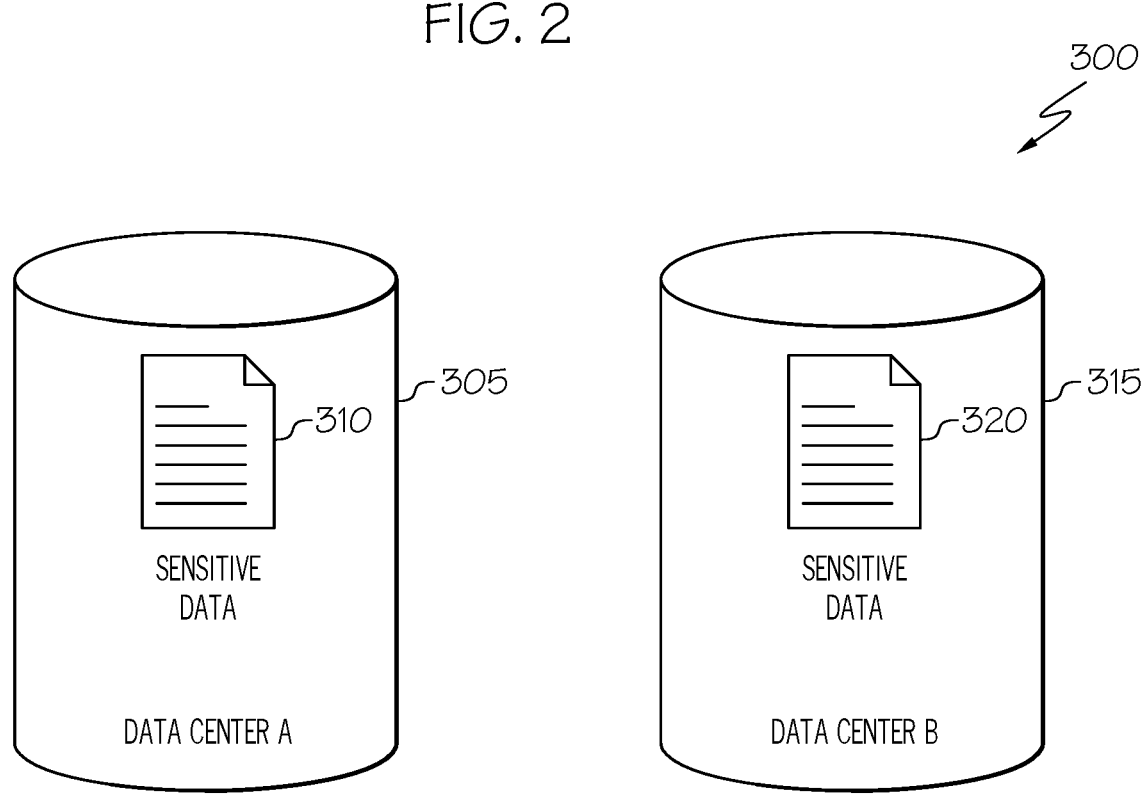
FIG. 3 depicts a diagram illustrating the presence of sensitive data at two separate data centers, in accordance with embodiments of the present invention.

FIG. 3 depicts a diagram 300 illustrating sensitive data 310 located at data center A 305 and sensitive data 320 located at data center B 310. As used herein, a "data center" refers to a physical or virtual facility where sensitive data can be stored and managed. It is a component of the system's infrastructure, and its role can include securely housing and maintaining the hardware and software resources required for storing, processing, and managing sensitive data. Specifically, a data center is where the actual data repositories are located.

Data location repository module 260 is configured to maintain data location information in a data location repository. To that end, data location repository module 260 can continually gather, organize, and store comprehensive information regarding the location of sensitive data within the system. It can ensure that all relevant data centers and their associated data repositories are documented and accounted for by constantly monitoring and recording data movements in real-time.

Data location repository module 260 is further configured to handle the dynamic nature of data storage within the system. It can monitor and update details about the specific data centers where sensitive data is stored. This can include changes in data center locations, additions or removals of data repositories, and/or updates to the data center's operational status. In essence, data location repository module 260 can act as the system's data map, keeping a record of where sensitive data resides, and it ensures that this information remains current and accurate.

Figure 4:
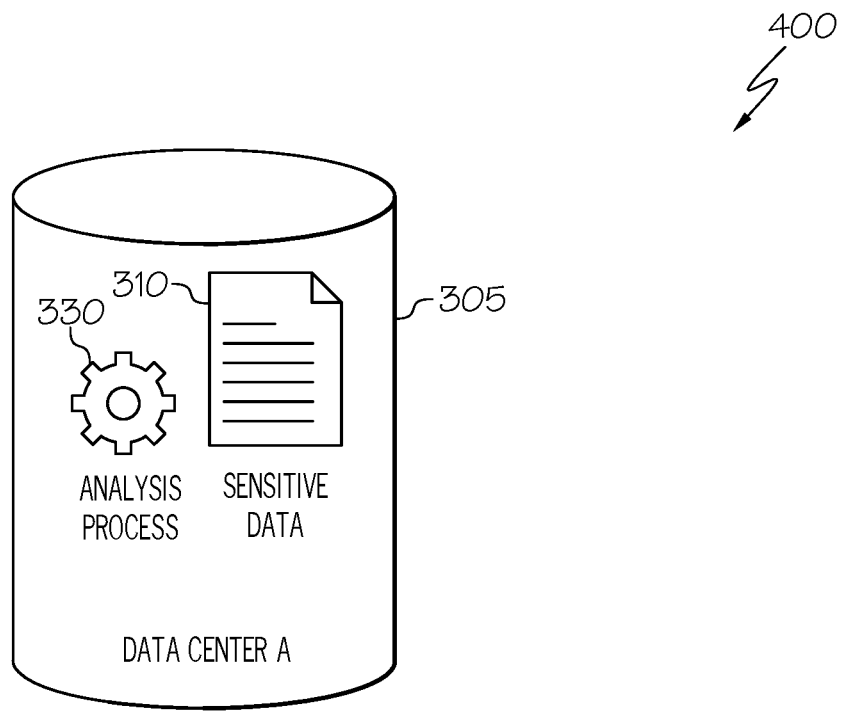
FIG. 4 depicts a diagram illustrating sensitive data and an analysis process located at a data center, along with analysis process 330, in accordance with embodiments of the present invention.

FIG. 4 depicts a diagram 400 illustrating sensitive data 310 located at data center A 305, along with analysis process 330. As used herein, "analysis process" refers to a systematic and structured approach used to examine, evaluate, and interpret data, information, or a particular subject matter in order to gain a deeper understanding, draw meaningful conclusions, make informed decisions, and/or the like. This process typically involves breaking down complex information into manageable components, identifying patterns, relationships, and trends, and applying relevant methodologies or tools to extract insights. It can encompass a wide range of fields, including data analysis, financial analysis, scientific research, and even critical thinking in everyday life.

The key steps in an analysis process generally involve defining the problem or objective, collecting relevant data, organizing and cleaning the data, applying appropriate techniques or models, and presenting the findings in a clear and concise manner. The goal of the analysis process is typically to transform raw information into valuable knowledge, enabling individuals or organizations to make informed choices, solve problems, and/or optimize their operations. It can serve as a crucial tool for decision-making and problem-solving in various domains.

The analysis process within this system can be initiated in any data center that is capable of running it. Once the process is started, the system takes on the responsibility of monitoring the data that needs to be accessed by this process. For instance, it achieves this by closely inspecting the input parameters of functions that are called by the process, such as "fopen". The fopen( ) method in the C programming language is a library function that is used to open a file to perform various operations which include reading, writing, etc. By monitoring these inputs, the system can determine which sensitive data files are being accessed and where they are located. This allows the system to ensure that the necessary data is available in the same data center where the process is being executed.

Process migration module 262 is configured to manage the relocation of computing processes that necessitate access to data stored across various data centers. It can ensure a secure and efficient migration process by orchestrating the transfer of computing processes to the precise data center where the necessary data is stored. By facilitating the transfer of computing processes to the specific data center where the relevant data is located, process migration module 262 can minimize the complexities associated with data access and enhances overall system performance.

One of the distinguishing features of this module is its capacity to understand the sensitivity of the data stored in different data centers. It can categorize data into sensitivity levels (e.g., sensitive, private, or public). This categorization can be instrumental in guiding the module's decision-making during the migration process. It can empower process migration module 262 to make informed choices regarding where and how to access data, ensuring that sensitive data is retrieved only from authorized and secure locations.

Figure 5:
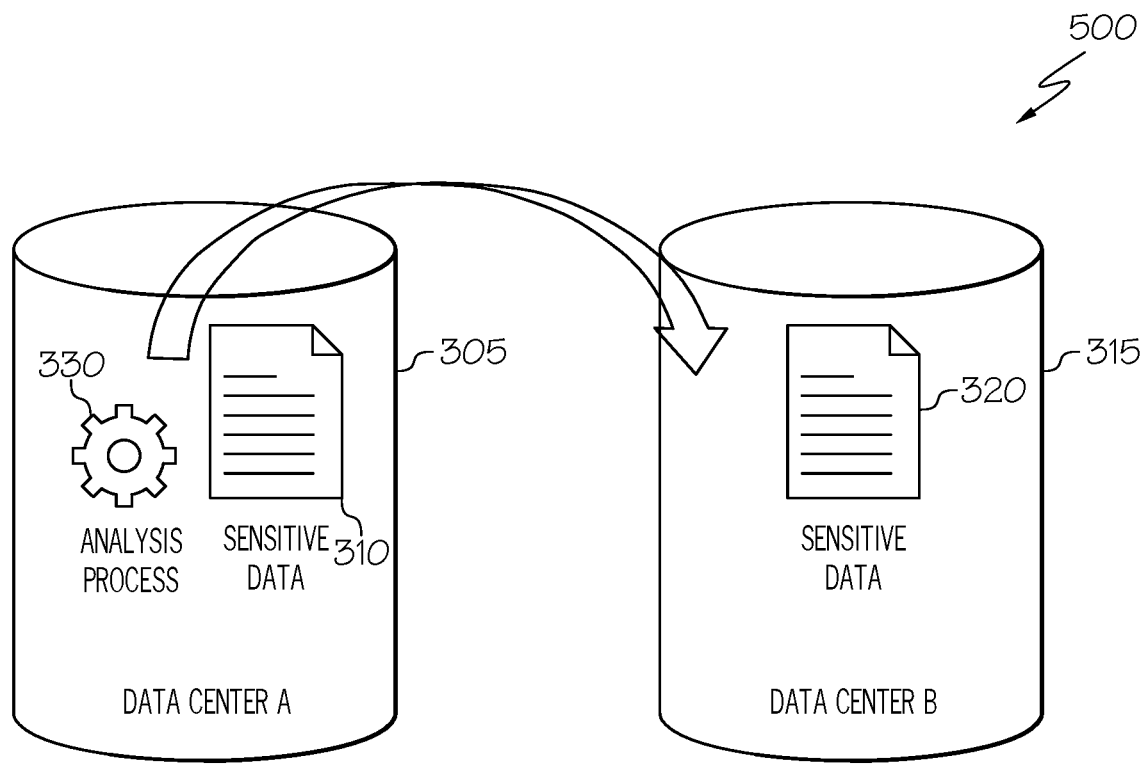
FIG. 5 depicts a diagram illustrating the presence of sensitive data located at different data centers and a migration of analysis process, in accordance with embodiments of the present invention.

FIG. 5 depicts a diagram 500 illustrating sensitive data 310 located at data center A 305, analysis process 330 located at data center A 305, and sensitive data 320 located at data center B 310. Sensitive data 310 and sensitive data 320 is overseen by data location repository module 260, which maintains a detailed record of the whereabouts of sensitive data. Process migration module 262 determines that when analysis process 330 is engaged in data analysis, it specifically requires access to the sensitive data 320, which is housed in data center B 310. Sensitive data 320 is essential for analysis process 330 to effectively carry out its tasks.

The awareness of data sensitivity and location can create a dynamic framework for process migration module 262 to operate within. It can allow for tailored, context-specific migration strategies that prioritize security and data integrity. Process migration module 262 actions are not only efficient but also can be aligned with data governance and compliance requirements, thereby contributing to the overall reliability and stability of the computing environment.

Process migration module 262 can facilitate the seamless migration of the necessary processes to the specific data center where the required sensitive data resides. Instead of physically moving the data, process migration module 262 can transfer the analysis process, ensuring that it operates directly on the data within its original storage location. This approach minimizes the risk associated with data transfer, maintaining the confidentiality and integrity of the sensitive information.

Data analysis module 264 is configured to facilitate data analysis processes across various data centers. One function is to enable the execution of these processes in a streamlined and efficient manner. This functionality can eliminate the need for data to be physically transferred between data centers, which not only saves time but also enhances data security. By allowing the analysis to take place directly within the data center where the information is stored, data analysis module 264 can mitigate the risks associated with data transportation and ensures that sensitive data remains securely contained within its designated location.

Figure 6:
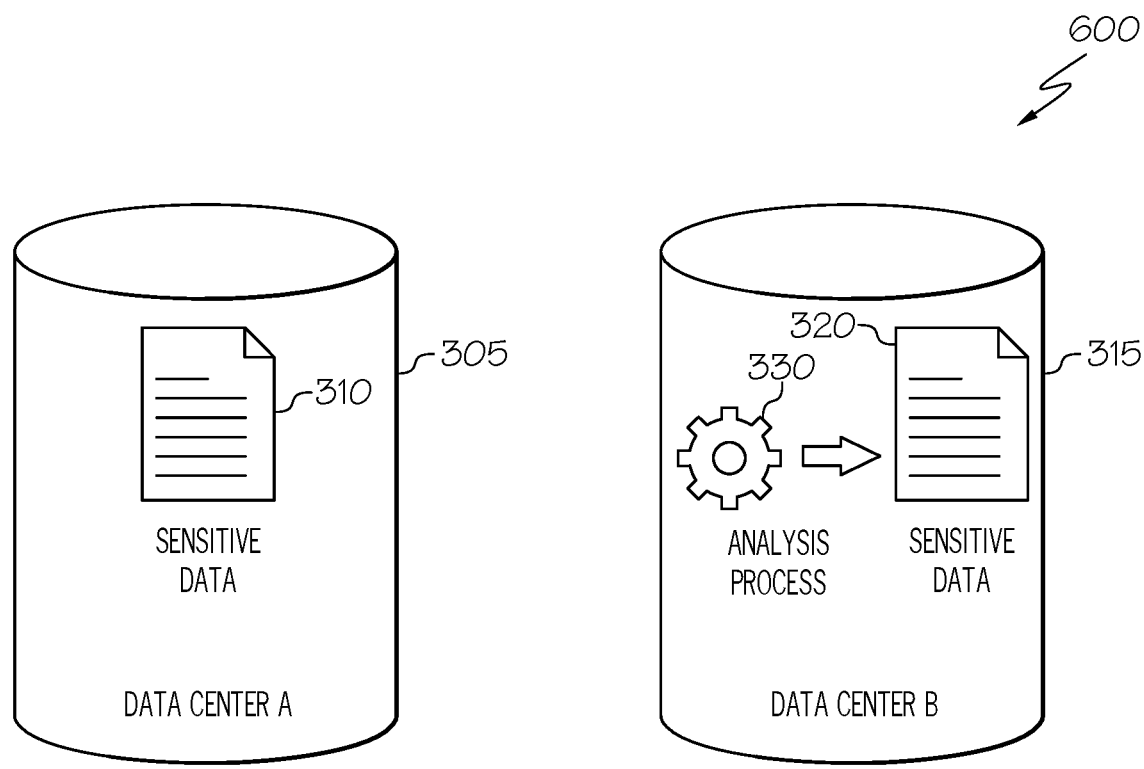
FIG. 6 depicts a diagram illustrating an execution of an analysis process after process migration, in accordance with embodiments of the present invention.

FIG. 6 depicts a diagram 600 illustrating sensitive data 310 located at data center A 305, analysis process 330 migrated to data center B 310, and sensitive data 320 located at data center B 310. Once analysis process 330 is migrated to data center B 310, it can seamlessly integrate with data analysis module 264. Data analysis module 264 can execute analysis process 330 within data center B 310 without the need to transfer the sensitive data physically. Analysis process 330 can operate directly on sensitive data 320 while ensuring robust security protocols are in place. By working with the data in its original location, data analysis module 264 can provide data security, allowing the analysis to be conducted efficiently and effectively.

An advantage of data analysis module 264 is its ability to work directly with sensitive data without the necessity of physically moving it. As stated, this approach can be pivotal for maintaining data security and confidentiality. Rather than exposing sensitive information to potential vulnerabilities during transit, data analysis module 264 can create a secure environment within the data center itself, where data analysis can occur. This strategy can align with typical best practices in data security and compliance, as it can reduce the surface area for potential data breaches, thus safeguarding sensitive information from unauthorized access. Moreover, by minimizing data transfer, data analysis module 264 can optimize the overall efficiency of data analysis processes. This not only reduces the time required for analysis but can also minimize the strain on network resources. As a result, organizations can derive insights and make data-driven decisions more rapidly, enhancing their competitive advantage and responsiveness.

Monitoring module 266 is configured to monitor capabilities to track the movement of processes and sensitive data across data centers. Monitoring module 266 can offer extensive monitoring capabilities to enhance system reliability, security, and compliance. A function is to track and monitor the movement of processes and sensitive data as they traverse various data centers. This monitoring system not only provides real-time visibility into the system's operations but can also act as a guardian, safeguarding data protection measures and security protocols and provide an alert to a user when any non-compliance is detected.

To maintain data security, the sensitive data stored in a current data center (e.g., either data center A 305 or datacenter B 315) cannot be migrated to another data center through process migration. However, monitoring module 266 can ensure that the usage of this sensitive data is closely monitored. It achieves this by monitoring the memory and functions of the analysis process 330. When the analysis process 330 is executed, the system allows the sensitive data in the current data center to be read into the memory and operated upon. However, if a new migration is triggered, the system enforces strict measures to prevent the migration of sensitive data. In such cases, the system will either cause the process to hang or exit, while also sending out warning messages. These precautions are in place to guarantee that the sensitive data remains within the current data center and is not transferred elsewhere.

It is important to note that while the result of the analysis process 330 can be transferred, the sensitive data itself is strictly prohibited from being transferred to maintain data confidentiality and security. Monitoring module 266 can ensure that analysis processes and data, particularly sensitive information, are moving in accordance with established protocols and security measures. This can include tracking the location and access of sensitive data and ensuring that it remains within the confines of secure data centers. By monitoring data flow, it can be capable of detecting any deviations from established norms or security protocols, instantly flagging potential security breaches or unauthorized access. Compliance with data protection regulations and security standards is typically a major concern for organizations today. Monitoring module 266 can actively verify that the system's operations align with regulatory requirements and internal security policies. By maintaining continuous oversight, it can help organizations maintain their compliance status and respond to any security incidents or breaches. In doing so, it not only safeguards sensitive data but can also ensure that the organization avoids potentially costly legal and reputational consequences.

Result migration module 268 is configured to ensure the efficient and secure transfer of analysis results from the data center where the analysis was performed back to the originating data center. Result migration module 268 can manage the seamless migration of processed data and analysis outcomes, providing a key link that enables the secure and flexible analysis of sensitive data across multiple data centers. In the context of a multi-center data analysis setup, where sensitive data is processed in one location and insights are derived, result migration module 268 can handle the movement of those valuable results. By facilitating this migration, result migration module 268 can ensure that the insights generated from the analysis can be leveraged by the originating data center without the need for data transfer. This approach can enhance efficiency, as it eliminates the potential security risks associated with physically moving sensitive data across different locations.

Figure 7:
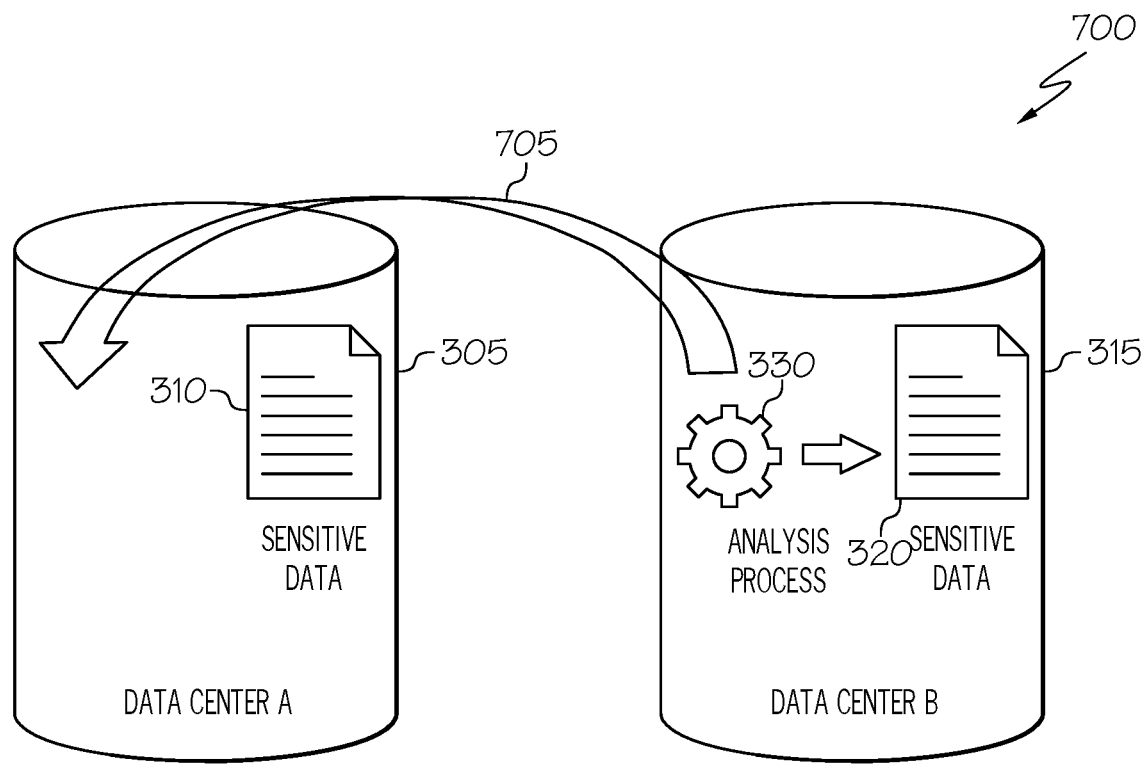
FIG. 7 depicts a diagram illustrating an analysis result being migrated to an originating data center, in accordance with embodiments of the present invention.

FIG. 7 depicts a diagram 700 illustrating analysis result 705 being migrated to the original data center (i.e., data center A 305). The process exports its results to the current data center. However, if this data center is not the one where the process originally started, the output will be migrated to the original data center. This migration ensures that a user can easily access the results. The system can operate transparently to the user, making it convenient for the user. In the example shown in FIG. 3, the process initially began at data center A 305, so the analysis results 705 stored in data center B 315 will be moved to data center A 305.

Figure 8:
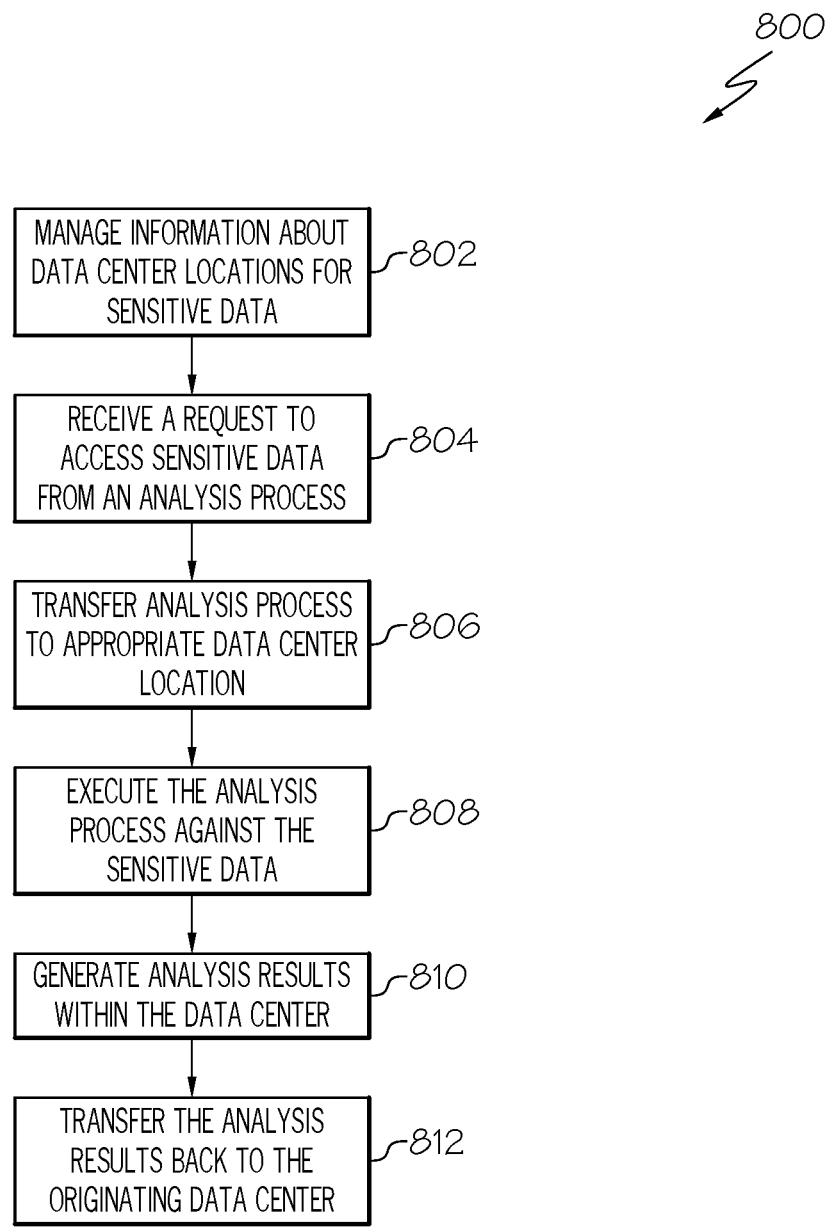
FIG. 8 depicts a flow diagram for managing the analysis of sensitive data across multiple data centers, in accordance with embodiments of the present invention.

FIG. 8 depicts a flowchart diagram 800 for managing the analysis of sensitive data across multiple data centers. At 802, data location repository module 260 stores and updates (i.e., manages) information about data center locations for sensitive data. At 804, process migration module 262 receives a request from an analysis process to access sensitive data from an analysis process. Process migration module 262 determines the specific data center where the data is stored and migrates the analysis process to the appropriate data center by transferring necessary process components to the selected data center, at 806. Data analysis module 264 receives the migrated analysis process in the designated data center.

At 808, data analysis module 264 executes the analysis process using locally stored sensitive data without physically transferring the data. Data analysis module 264 generates analysis results within the data center, at 810. Monitory module 266 continuously monitors the analysis process and data movement across data centers to track execution and progress of migrated processes and ensure compliance with data protection measures and security protocols. Result migration module 268 receives the analysis results generated in the data center. It identifies the original data center where the process originated and transfers the analysis results back to the originating data center, at 812.

The illustrated steps in FIG. 8 are not necessarily performed in the order shown, and some steps may be performed concurrently or in a different order than shown. The flowchart diagrams are intended to illustrate the general flow of the method and is not intended to be limiting. Additional steps may be added, or some steps may be omitted without departing from the scope of the invention. The steps may be performed by a computer program or by a combination of hardware and software. The flowchart diagram may be implemented using any suitable programming language or tool.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing an analysis of sensitive data across multiple data centers, comprising:
   receiving, by a process migration engine, a request to access sensitive data from an analysis process executing on a first data center;
   determining, by the process migration engine, a second data center where the sensitive data is stored;
   migrating, by the process migration engine, the analysis process from the first data center to the second data center;
   executing, by the process migration engine, the analysis process on the second data center using the sensitive data being stored at the second data center without transferring the sensitive data from the first data center;
   generating, by the process migration engine, an analysis result within the second data center; and
   transferring, by the process migration engine, the analysis result from the second data center to the first data center.

2. The method of claim 1, further comprising storing and updating, by the process migration engine, information about data center locations for sensitive data in a data location repository.

3. The method of claim 1, wherein migrating the analysis process includes transferring necessary process components of the analysis process to the second data center.

4. The method of claim 1, further comprising continuously monitoring, by the process migration engine, the analysis process and data movement across data centers to track an execution progress of the migrated analysis process.

5. The method of claim 1, further comprising detecting, by the process migration engine, a non-compliance with a data protection measure or security protocol.

6. The method of claim 5, further comprising generating, by the process migration engine, an alert when the non-compliance is detected.

7. The method of claim 1, further comprising updating, by the process migration engine, the first data center with the analysis results for user access.

8. A computing system for managing an analysis of sensitive data across multiple data centers, comprising:
   a processor;
   a memory device coupled to the processor; and
   a computer readable storage device coupled to the processor, wherein the storage device contains program code executable by the processor via the memory device to implement a method, the method comprising:
   receiving, by a process migration engine, a request to access sensitive data from an analysis process executing on a first data center;
   determining, by the process migration engine, a second data center where the sensitive data is stored;
   migrating, by the process migration engine, the analysis process from the first data center to the second data center;
   executing, by the process migration engine, the analysis process on the second data center using the sensitive data being stored at the second data center without transferring the sensitive data from the first data center;
   generating, by the process migration engine, an analysis result within the second data center; and
   transferring, by the process migration engine, the analysis result from the second data center to the first data center.

9. The computing system of claim 8, the method further comprising storing and updating, by the process migration engine, information about data center locations for sensitive data in a data location repository.

10. The computing system of claim 8, wherein migrating the analysis process includes transferring necessary process components of the analysis process to the second data center.

11. The computing system of claim 8, the method further comprising continuously monitoring, by the process migration engine, the analysis process and data movement across data centers to track an execution progress of the migrated analysis process.

12. The computing system of claim 8, the method further comprising detecting, by the process migration engine, a non-compliance with a data protection measure or security protocol.

13. The computing system of claim 12, the further method comprising generating, by the process migration engine, an alert when the non-compliance is detected.

14. The computing system of claim 8, the method further comprising updating, by the process migration engine, the first data center with the analysis results for user access.

15. A computer program product for managing an analysis of sensitive data across multiple data centers, and program instructions stored on the computer readable storage device, to:
   receive, by a process migration engine, a request to access sensitive data from an analysis process executing on a first data center;
   determine, by the process migration engine, a second data center where the sensitive data is stored;
   migrate, by the process migration engine, the analysis process from the first data center to the second data center;
   execute, by the process migration engine, the analysis process on the second data center using the sensitive data being stored at the second data center without transferring the sensitive data from the first data center;

generate, by the process migration engine, an analysis result within the second data center; and transfer, by the process migration engine, the analysis result from the second data center to the first data center.

16. The computer program product of claim 15, further comprising program instructions stored on the computer readable storage device to store and update, by the process migration engine, information about data center locations for sensitive data in a data location repository.

17. The computer program product of claim 15, wherein migrating the analysis process includes transferring necessary process components of the analysis process to the second data center.

18. The computer program product of claim 15, further comprising program instructions stored on the computer readable storage device to continuously monitor, by the process migration engine, the analysis process and data movement across data centers to track an execution progress of the migrated analysis process.

19. The computer program product of claim 15, further comprising program instructions stored on the computer readable storage device to detect, by the process migration engine, a non-compliance with a data protection measure or security protocol.

20. The computer program product of claim 19, further comprising program instructions stored on the computer readable storage device to generate, by the process migration engine, an alert when the non-compliance is detected.

* * * * *